United States Patent
Long et al.

(10) Patent No.: US 9,315,125 B2
(45) Date of Patent: Apr. 19, 2016

(54) BABY CAR SEAT

(71) Applicant: Goodbaby Child Products Co., Ltd., Lujia Town, Kunshan, Jiangsu (CN)

(72) Inventors: Liyun Long, Lujia Town (CN); Bangzhou Wang, Lujia Town (CN); Youcai Zhang, Lujia Town (CN)

(73) Assignee: Goodbaby Child Products Co., Ltd., Kunshan, Jiangsu (CN)

( * ) Notice: Subject to any disclaimer, the term of this patent is extended or adjusted under 35 U.S.C. 154(b) by 0 days.

(21) Appl. No.: 14/404,614

(22) PCT Filed: May 28, 2013

(86) PCT No.: PCT/CN2013/076297
§ 371 (c)(1),
(2) Date: Nov. 29, 2014

(87) PCT Pub. No.: WO2013/178046
PCT Pub. Date: Dec. 5, 2013

(65) Prior Publication Data
US 2015/0115670 A1 Apr. 30, 2015

(30) Foreign Application Priority Data
May 31, 2012 (CN) ...................... 2012 2 0253787 U (51) Int. Cl.
*B60N 2/28* (2006.01)
*B60N 2/48* (2006.01)
*B60N 2/68* (2006.01)

(52) U.S. Cl.
CPC .............. *B60N 2/2851* (2013.01); *B60N 2/286* (2013.01); *B60N 2/2866* (2013.01);
(Continued)

(58) Field of Classification Search
CPC ...... B60N 2/2851; B60N 2/26; B60N 2/2866; B60N 2/2872; B60N 2002/2204; B60N 2002/2896; B60N 2/2821; B60N 2/32; B60N 2/4805; B60N 2/4811

USPC ........ 297/183.1, 183.4, 378.1, 440.1, 440.14, 297/440.15, 440.16, 410, 256.1, 256.16
See application file for complete search history.

(56) References Cited

U.S. PATENT DOCUMENTS 5,275,462 A 1/1994 Pond et al.
6,908,151 B2 * 6/2005 Meeker ................ B60N 2/2806
297/250.1

(Continued)

FOREIGN PATENT DOCUMENTS

CN 1810540 8/2006
CN 201721359 1/2011

(Continued)

*Primary Examiner* — Beth Stephan
(74) *Attorney, Agent, or Firm* — Connie Ding; Peter L. Brewer; Baker Donelson IP (57) ABSTRACT

The invention discloses a baby car seat, which comprises a seat, a backrest with a lower portion being detachably connected with a rear portion of the seat, and a head support detachably connected with an upper portion of the backrest. The backrest comprises a backrest body and a pair of backrest wings extending forwards from a left end and a right end of the backrest body respectively. The head support comprises a head support body and a pair of head support wings respectively extending forwards from a left side and a right side of the head support. Two accommodating holes respectively are opened on a left part and a right part of the backrest body, and the shape and mutual distance of the two accommodating holes are matched with that of the two head support wings. When the head support is accommodated between the pair of backrest wings, the two accommodating holes respectively are used for inserting the corresponding head support wings therein. When it is desired to package and transport the car seat, the head support is located between the two backrest wings and the backrest body, and the two head support wings just are inserted into the two accommodating holes of the backrest body and further stacked up with the seat, thus, the height of the car seat is reduced, the volume of encasement is reduced and the quantity of encasement is increased.

10 Claims, 5 Drawing Sheets

(52) U.S. Cl.
CPC ........... *B60N 2/2872* (2013.01); *B60N 2/2878* (2013.01); *B60N 2/4808* (2013.01); *B60N 2/4814* (2013.01); *B60N 2/4817* (2013.01); *B60N 2002/2896* (2013.01); *B60N 2002/684* (2013.01)

(56) References Cited

U.S. PATENT DOCUMENTS

| | | | | | |
|---|---|---|---|---|---|
| 7,021,710 | B2 * | 4/2006 | Kain | | B60N 2/2851 297/250.1 |
| 7,055,903 | B2 * | 6/2006 | Balensiefer | | B60N 2/2821 297/250.1 |
| 7,303,230 | B2 * | 12/2007 | Munn | | B60N 2/20 297/255 |
| 7,322,647 | B2 * | 1/2008 | Munn | | B60N 2/2851 297/250.1 |
| 7,370,912 | B2 * | 5/2008 | Williams | | B60N 2/2851 297/250.1 |
| 7,452,031 | B2 * | 11/2008 | Woellert | | B60N 2/2851 297/218.1 |
| 7,625,043 | B2 * | 12/2009 | Hartenstine | | B60N 2/2806 297/250.1 |
| 8,109,571 | B2 * | 2/2012 | Chen | | B60N 2/2821 297/250.1 |
| 8,622,476 | B2 * | 1/2014 | Karremans | | B60N 2/2812 297/250.1 |
| 9,016,782 | B2 * | 4/2015 | Xu | | B60N 2/2851 297/250.1 |
| 2002/0145318 | A1 * | 10/2002 | Asbach | | B60N 2/2812 297/250.1 |
| 2003/0151282 | A1 * | 8/2003 | Williams | | B60N 2/2851 297/250.1 |
| 2004/0124677 | A1 * | 7/2004 | Meeker | | B60N 2/2806 297/255 |
| 2004/0124678 | A1 * | 7/2004 | Williams | | B60N 2/2851 297/256.11 |
| 2004/0189068 | A1 * | 9/2004 | Meeker | | B60N 2/2806 297/250.1 |
| 2005/0200177 | A1 * | 9/2005 | Balensiefer | | B60N 2/2851 297/250.1 |
| 2007/0236061 | A1 * | 10/2007 | Meeker | | B60N 2/20 297/250.1 |
| 2012/0098304 | A1 * | 4/2012 | Gaudreau, Jr. | | B60N 2/2812 297/216.11 |
| 2012/0175921 | A1 * | 7/2012 | Gaudreau, Jr. | | B60N 3/101 297/183.1 |

FOREIGN PATENT DOCUMENTS

| | | | |
|---|---|---|---|
| CN | 202098305 | 1/2012 | |
| FR | 2817811 | 1/2002 | |
| WO | WO 2012116622 A1 * | 9/2012 | ........... B60N 2/2851 |

* cited by examiner

BABY CAR SEAT

CROSS REFERENCE TO RELATED APPLICATIONS

This application is a §371 National State Application of PCT/CN2013/076297 filed May 28, 2013 which claims priority to CN 201220253787.9 filed May 31, 2012, and issued as CN 202686018 on Jan. 23, 2013.

FIELD OF THE INVENTION

The present invention relates to a baby car seat.

DESCRIPTION OF THE RELATED ART

Generally a baby car seat comprises a seat, a backrest with a lower portion being detachably connected with a rear portion of the seat, and a head support. The backrest comprises a backrest body, backrest wings located at a left and right sides of the backrest body. The head support comprises a head support bracket, a head support body fixedly disposed on the head support bracket, and head support wings located at a left and right sides of the head support body. The head support bracket is detachably connected with the backrest body, the head support bracket can move upwards or downwards relative to the backrest body, and the location of the head support bracket relative to the backrest body is controlled by a position adjustment mechanism. When the car seat is disassembled to be packaged, the seat, backrest and head support are stacked up, however, the head support bracket and the head support body will take up a big space so that the packaging volume of the product is large.

SUMMARY OF THE INVENTION

A technical problem to be solved by the invention is to provide a baby car seat. In order to solve the above problem, the following technical solution is utilized in the invention: a baby car seat comprises a seat, a backrest with a lower portion being detachably connected with a rear portion of the seat, and a head support detachably connected with an upper portion of the backrest. The backrest comprises a backrest body and a pair of backrest wings respectively extending forwards from a left end and a right end of the backrest body. The head support comprises a head support body, and a pair of head support wings respectively extending forwards from a left side and a right side of the head support body. Two accommodating holes respectively are opened on a left part and a right part of the backrest body, and the shape and mutual distance of the two accommodating holes are matched with that of the two head support wings. The two accommodating holes respectively are used for inserting the corresponding head support wings therein, when the head support is accommodated between the two backrest wings. The terms "left" and "right" mentioned herein and throughout the invention are defined according to usual habits of a user, and when a user faces to the front side of the car seat, the left hand side refers to "right", and the right hand side refers to "left".

In some embodiments, the backrest wings and the backrest body are integrated into one piece.

In some embodiments, the head support wings and the head support body are integrated into one piece.

In a preferable embodiment, the head support also comprises a head support bracket on which the head support body is slidably disposed on along a longitudinal direction of the head support, the head support is connected with the backrest body by a lower portion of the head support bracket, and a position adjustment mechanism is arranged between the head support bracket and the head support body for controlling the location of the head support body relative to the head support bracket.

In a more preferable embodiment, the position adjustment mechanism comprises: a plurality of locking grooves which are formed as recesses by opening on a side of the head support bracket; a position-limit groove opened on the head support body; a locking pin which is slidably disposed within the position-limit groove along the position-limit groove; and an operating handle slidably disposed on the head support body along the longitudinal direction of the head support. The plurality of locking grooves are arranged along the longitudinal direction of the head support. The center line of the longitudinal section of the position-limit groove is substantially parallel to the center line of the longitudinal section of each locking groove. A guiding inclined groove is opened on the operating handle, and the guiding inclined groove is inclined relative to the longitudinal direction of the head support and the center line of the longitudinal section of the position-limit groove. The locking pin is inserted into the guiding inclined groove. During the sliding of the operating handle relative to the head support body, the locking pin slides along the position-limit groove under guiding of the guiding inclined groove such that the position adjustment mechanism has a locked position and a unlocked position, when in the locked position, one of the locking grooves is corresponding to the position-limit groove and the locking pin is inserted into the locking groove, and when in the unlocked position, the locking pin is detached from the locking groove, such that the head support body is released relative to the head support bracket. The term "longitudinal direction" mentioned herein and throughout the invention is defined according to usual habits of a user, and the said "longitudinal direction" refers to the up-down extending direction of the head support, and not necessarily is in conformity with the vertical direction.

In a specific embodiment, the position adjustment mechanism also comprises an elastic member which is used for applying a force on the locking pin such that the locking pin can be steadily inserted into the locking groove. More preferably, the elastic member is arranged between the operating handle and the head support body.

In a more preferable embodiment, the center line of the longitudinal section of each locking groove and the center line of the longitudinal section of the position-limit groove respectively are perpendicular to the longitudinal direction of the head support.

In a more preferable embodiment, the longitudinal section of the locking groove is U-shaped, such that the position-limit groove forms a closed groove together with the locking groove when the position adjustment mechanism is in the locked position.

More preferably, the guiding inclined groove has an upper side portion and a lower side portion, the upper side portion of the guiding inclined groove is substantially corresponding to the locking groove in the longitudinal direction, and the lower portion of the guiding inclined groove is substantially corresponding to the outside of the opening of the locking groove in such a way that: when the position adjustment mechanism is in the locked position, the locking pin is in the upper side portion of the guiding inclined groove, when the position adjustment mechanism is in the unlocked position, the locking pin is in the lower side portion of the guiding inclined groove.

In a more specific embodiment, the head support body comprises a front cover plate and a rear cover plate fixedly connected with the front cover plate, an accommodating space with an downward opening is formed between the front cover plate and the rear cover plate, the head support bracket and the operating handle are located in the accommodating space, and the operating handle is located between the head support bracket and the rear cover plate, and a window is opened on the rear cover plate for conveniently operating the operating handle.

The scope of the invention is not limited to the technical solutions particularly combined by the abovementioned technical features, other technical solutions discretionarily combined by the above-mentioned technical features or equivalent features should also be covered in the present invention, such as the technical solutions formed by exchanging the aforementioned features with the technical features having the similar functions, including but no limited to, disclosed in the invention.

Due to the above technical solution, the present invention has the following advantages as compared with the prior art: in the baby car seat of the invention, two accommodating holes are opened on the backrest body, when the car seat is required to be packaged for transportation, the head support is located between the two backrest wings and the backrest body, such that the head support wings just are inserted into the two accommodating holes on the backrest body and further stacked up with the seat, thus, the height of the car seat is reduced, the volume of encasement is reduced and the quantity of encasement is increased.

wherein: 1. a seat; 2. a backrest; 3. a head support; 4. a head support body; 5. a head support bracket; 6. an operating handle; 7. a front cover plate; 8. a rear cover plate; 9. a locking groove; 10. a position-limit groove; 11. a guiding inclined groove; 12. an elastic member; 13. a locking pin; 14, a head support wing; 15. a backrest body; 16. a backrest wing; 17. an accommodating hole.

DESCRIPTION OF THE PREFERRED EMBODIMENTS

Figure 1:
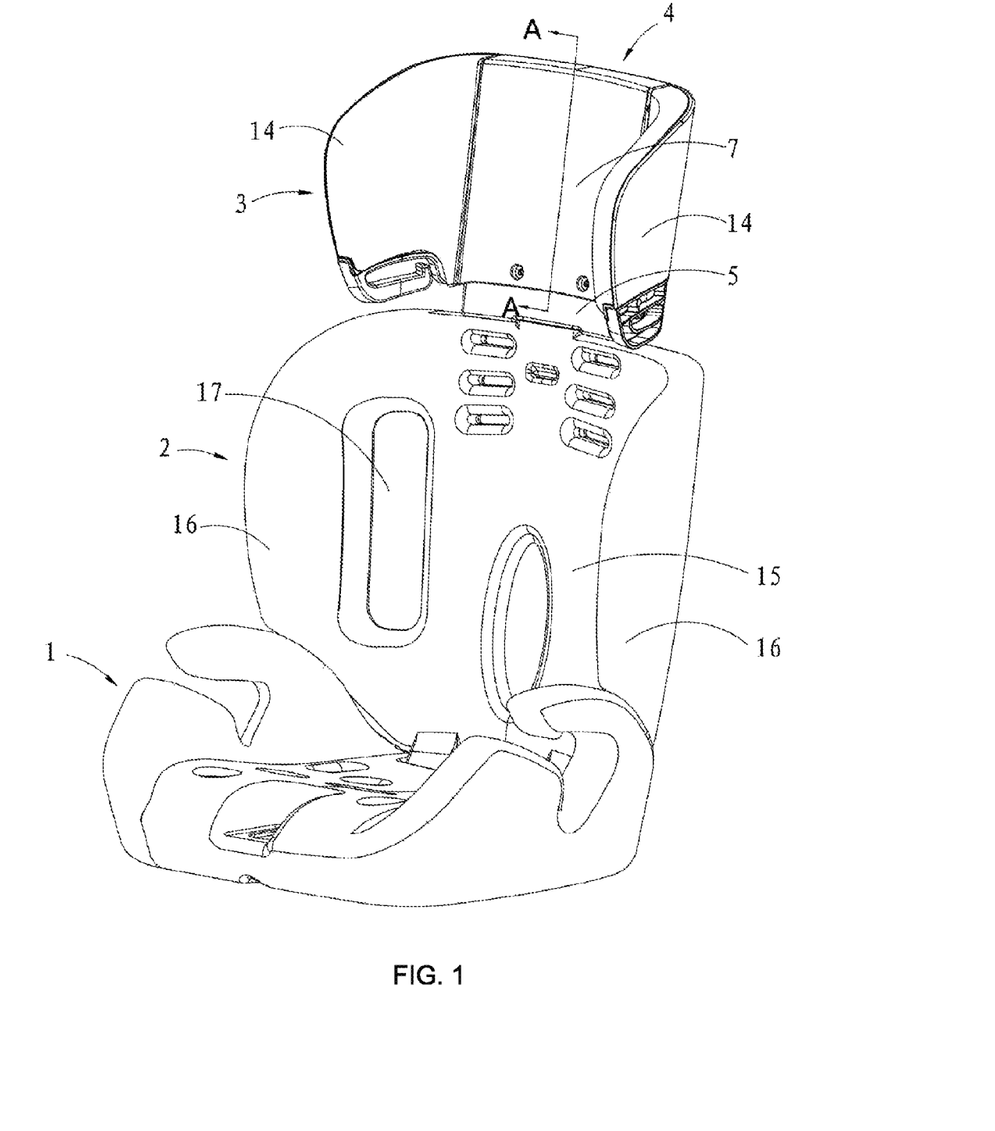
FIG. 1 is a perspective drawing of the baby car seat in normal use according to the invention.
Figure 2:
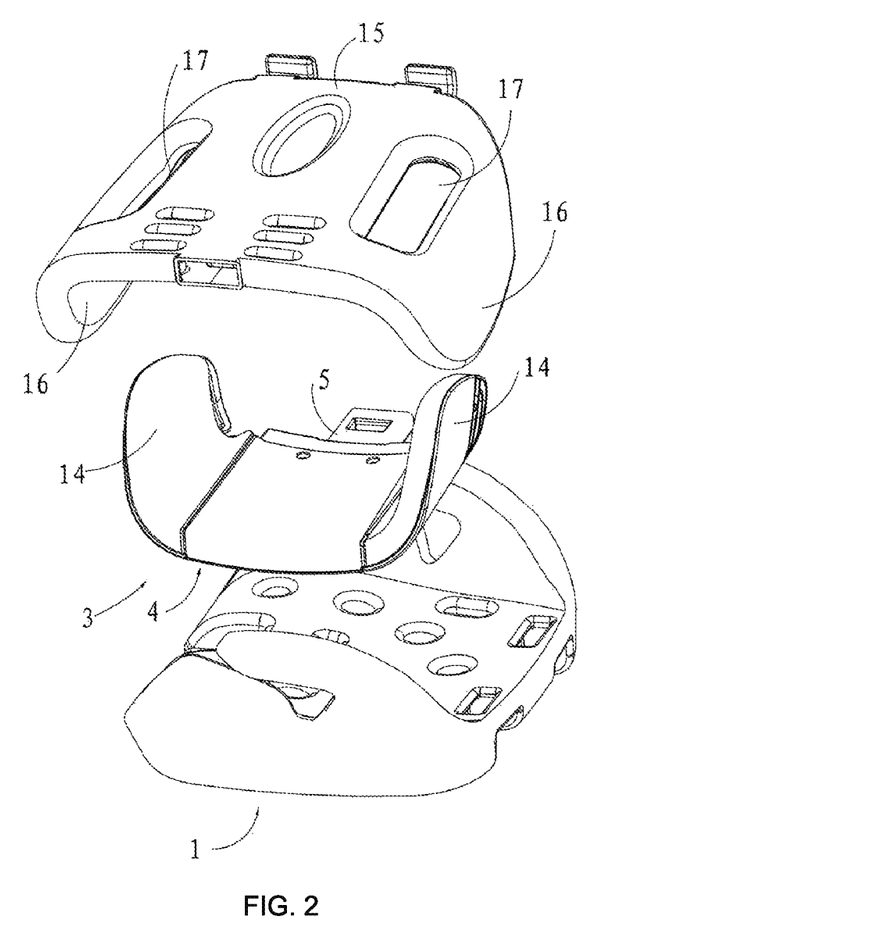
FIG. 2 is an exploded view of the baby car seat according to the invention.
Figure 3:
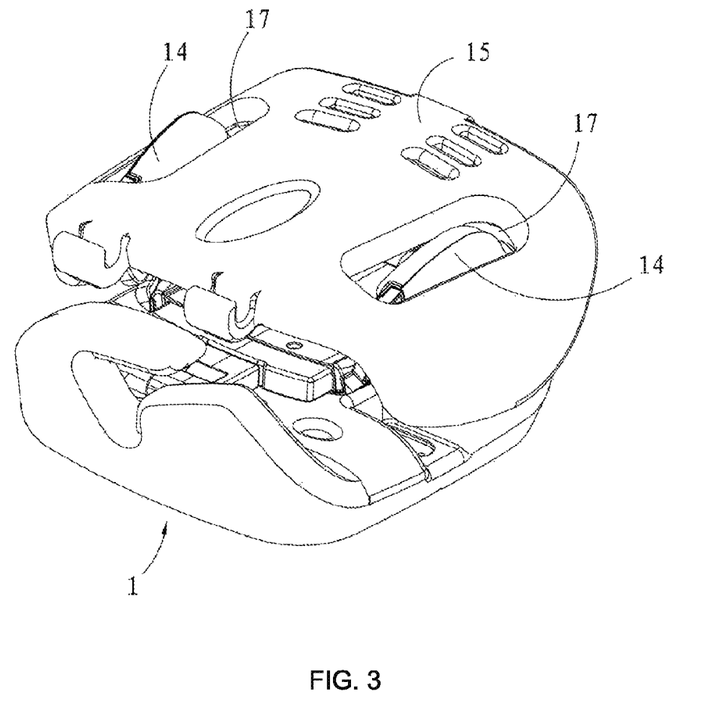
FIG. 3 is a schematic drawing showing the packaging the baby car seat according to the invention.

As shown in FIGS. 1-3, a baby car seat comprises a seat 1, a backrest 2 with a lower portion being detachably connected with a rear portion of the seat 1, a head support 3 detachably connected with an upper portion of the backrest 2. The backrest 2 comprises a backrest body 15 and backrest wings 16 respectively located at a left side and a right side of the backrest body 15. The head support 3 comprises a head support body 4 and head support wings 14 respectively located at a left side and a right side of the head support body 4. Two accommodating holes 17 respectively are opened on a left part and a right part of the backrest body 15, and the two accommodating holes 17 respectively are used for inserting the head support wings 14 therein when the head support 3 is accommodated between the backrest wings 16.

The lower portion of the backrest body 15 is detachably connected with the rear portion of the seat 1. The upper portion of the backrest 15 is detachably connected with the lower portion of the head support bracket 5 described hereinafter. The specific detachable configuration does not refer to the technical points of the invention, and thus will not be described in more detail herein. Any configurations can be used herein, provided that they can achieve the detachable connection between two parts.

The backrest wings 16 and the backrest body 15 are fixedly connected to each other to form a whole. Alternatively, the backrest wings 16 and the backrest body 15 are slidably connected with each other in the left-right direction, and a width adjusting mechanism is arranged between the backrest wings 16 and the backrest body 15. When the car seat is packaged, the two backrest wings 16 may be adjusted into a widest position so that the head support wings 14 can be inserted into the accommodating holes 17. The head support wings 14 is fixedly connected with the head support body 4 to form a whole.

As shown in FIGS. 1 and 4-6, the head support 3 also comprises a head support bracket 5, the head support body 4 is slidably disposed on the head support bracket 5 in the up-down direction, the lower portion of the head support bracket 5 is detachably connected with the upper portion of the backrest body 15, and a position adjustment mechanism is arranged between the head support bracket 5 and the head support body 4. When it is required to package and transport the car seat, the head support bracket 5 is detached from the backrest body 15, and the height between the head support bracket 5 and the head support body 4 is adjusted to a minimum value by the position adjustment mechanism, such that volume of the car seat after packaging is reduced.

Figure 4:
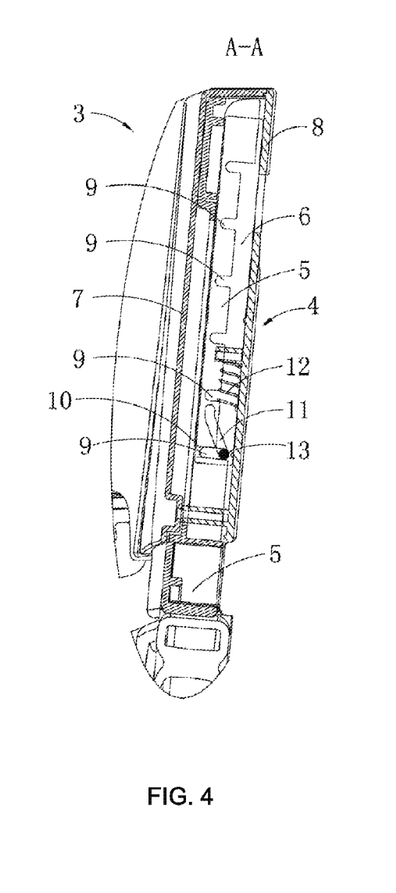
FIG. 4 is a sectional view of the FIG. 1 along the line A-A, wherein the position adjustment mechanism is in the unlocked position and the head support body is in a low position.
Figure 5:
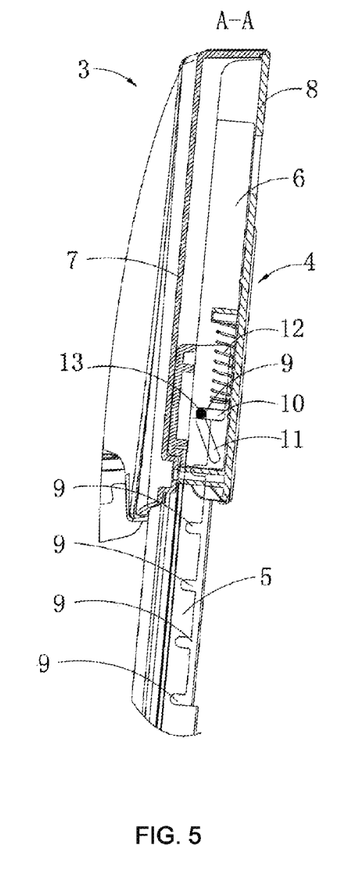
FIG. 5 is a sectional view of the FIG. 1 along the line A-A, wherein the position adjustment mechanism is in the locked position and the head support body is in a high position.
Figure 6:
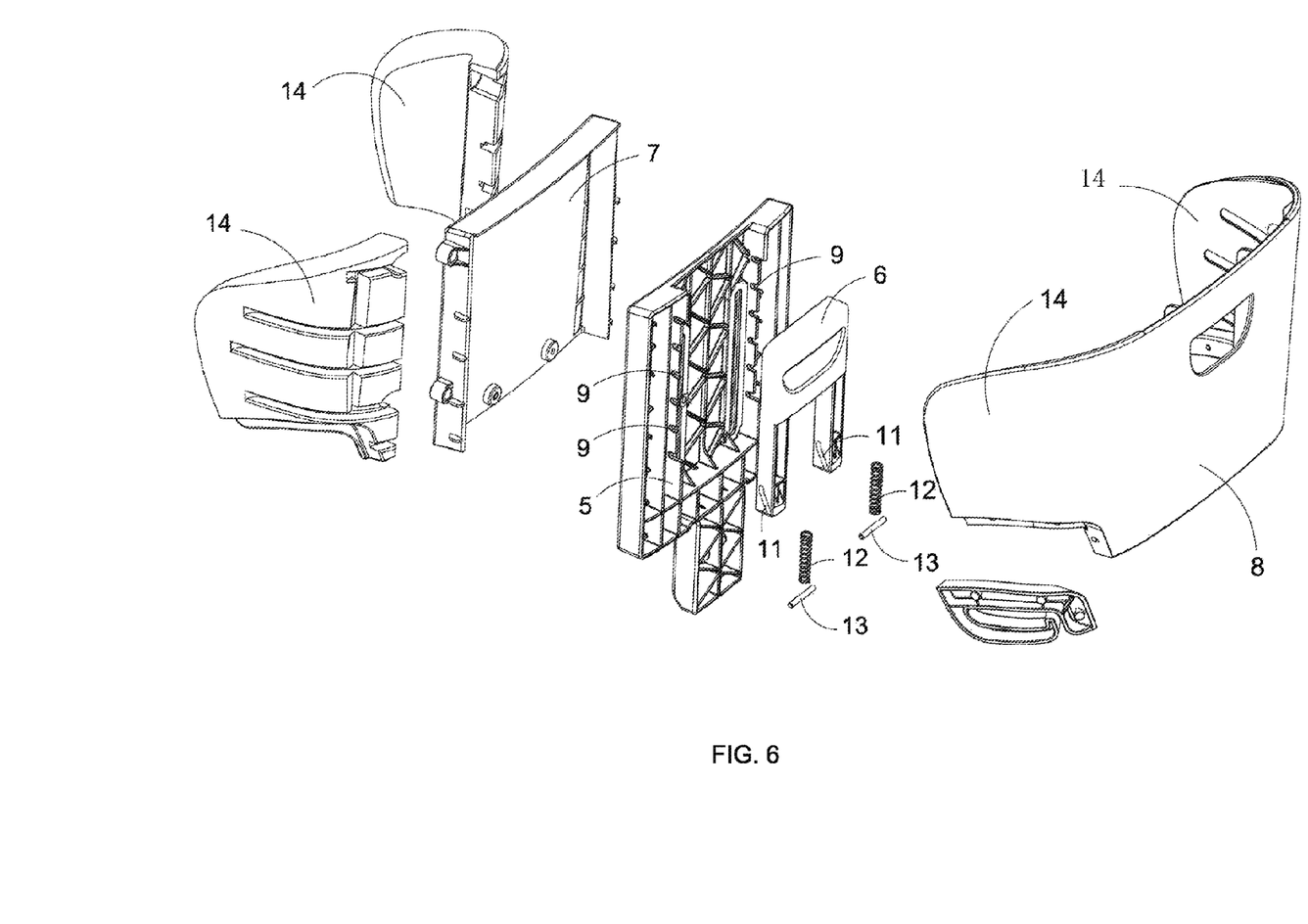
FIG. 6 is an exploded view of the head support according to the invention.

The position adjustment mechanism comprises a plurality of U-shaped locking grooves 9 which are formed as recesses by opening on a side of the head support bracket 5, a position-limit groove 10 opened on the head support body 4, an operating handle 6 slidably disposed on the head support body 4 along the up-down direction, and a locking pin 13. A guiding inclined groove 11 which is inclined in the up-down direction is opened on the operating handle 6 for driving the locking pin 13 to move. The locking pin 13 is always inserted into the guiding inclined groove 11. The center lines of the locking grooves 9 and the position-limit groove 10 respectively extend along a direction perpendicular to the sliding direction of the head support body 4. The plurality of locking grooves 9 are distributed on the head support bracket 5 along the up-down direction. The position-limit groove 10 also is U-shaped.

The position adjustment mechanism has a locked position and an unlocked position. When the position adjustment mechanism is in the locked position, the locking pin 13 is inserted into one of the locking grooves 9 which is corresponding to the position-limit groove 10, and the locking pin 13 is located in a side portion of the guiding inclined groove 11. When the position adjustment mechanism is in the unlocked position, the locking pin 3 is detached from all of the locking grooves 9, the locking pin 13 is inserted into the position-limit groove 10, and the locking pin 13 is located in the other side portion of the guiding inclined groove 11. The position adjustment mechanism also comprises an elastic member which makes the locking pin be steadily inserted into the locking groove 9.

The position-limit groove 10 also may be a closed elongated groove (not shown). When the position adjustment mechanism is in the locked position, the locking pin 13 is inserted into both one of the locking grooves 9 and the position-limit groove 10.

In the embodiment shown in FIGS. 4-5, the center line of each locking groove 9 and the center line of the position-limit groove 10 respectively extend along the front-rear direction. The generic terms "front" and "rear" mentioned herein and throughout the invention are defined according to usual habits of a user, "front" refers to a side of the car seat where the seat is provided, "rear" refers to the back side of the car seat, and the front-rear direction refers to a direction of a line extending through the car seat from front to rear or from rear to front, and is not necessarily parallel to the horizontal plane.

The upper side portion of the guiding inclined groove 11 is in the front, and the lower side portion of the guiding inclined groove 11 is in the rear. When the position adjustment mechanism is in the locked position, the locking pin 13 is located is the upper side portion of the guiding inclined groove 11. When the position adjustment mechanism is in the unlocked position, the locking pin 13 is located in the lower side portion of the guiding inclined groove 11.

The elastic member 12 is arranged between the operating handle 6 and the head support body 4. Specifically, the elastic member 12 is arranged between the operating handle 6 and the rear cover plate 8 described hereinafter. The elastic member 12 also may be directly disposed between the locking pin 13 and the head support body 4.

The position-limit groove 10 also is U-shaped. When the position adjustment mechanism is in the locked position, the position-limit groove 10 and the locking groove 9 together constitute a closed groove. The head support body 4 comprises a front cover plate 7 and a rear cover plate 8 fixedly connected with the front cover plate 7. An accommodating space with a downward opening is formed between the front cover plate 7 and the rear cover plate 8. The head support bracket 5 and the operating handle 6 are located in the accommodating space, and the operating handle 6 is located between the head support bracket 5 and the rear cover plate 8. A window is opened on the rear cover plate 8 for controlling the operating handle 6.

The operation course of the baby car seat is as follows: the position adjustment mechanism in the locked position overcomes the elastic force of the elastic member 12 to pull upwards the operation handle 6, such that the locking pin 13 is detached from the locking groove 9 under the cooperation of the position-limit groove 10 and the guiding inclined groove 11. The head support body 4 can be moved upwards or downwards, and when it is moved into an appropriate position, the operating handle 6 is released and restores under the elastic force of the elastic member 12, such that the locking pin 13 is inserted into the corresponding locking groove 9. Provided that the upper side portion of the guiding inclined groove 11 is in the rear and the lower side portion of the guiding inclined groove 11 is in the front, it is required to press downwards the operating handle 6 to convert the position adjustment mechanism from the locked position to the unlocked position. Thus, the head support body 4 can be converted between a high position and a low position, that is to say, the height of the head support body 4 can be adjusted. Furthermore, the car seat of the invention has a smaller volume when packaging.

The above embodiments are described for illustrating the technical concept and features of invention, the aim is intended to enable a person skilled in the art to appreciate the content of the invention and further implement it, and the protecting scope of the invention can not be limited hereby. Also, any equivalent variations or modifications made according to the spirit of the invention should be covered within the protecting scope of the invention.

What is claimed is:

1. A baby car seat, comprising
   a seat (1);
   a backrest (2) with a lower portion being detachably connected with a rear portion of the seat (1), the backrest (2) comprising a backrest body (15) and a pair of backrest wings (16) respectively extending forwards from a left end and a right end of the backrest body (15);
   a head support (3) detachably connected with an upper portion of the backrest (2), which comprises a head support body (4) and a pair of head support wings (14) respectively extending forwards from a left side and a right side of the head support body (4);
   wherein two accommodating holes (17) extend through the backrest body and are located respectively on a left part and a right part of the backrest body (15) to be used for inserting the corresponding head support wings (14) therein when the head support (3) is accommodated between the two backrest wings (16), the shape and mutual distance of the two accommodating holes (17) being matched with that of the two head support wings (14); and
   wherein the head support (3) further comprises a head support bracket (5) on which the head support body (4) is slidably disposed along a longitudinal direction of the head support (3), the head support (3) is connected with the backrest body (15) by a lower portion of the head support bracket (5), and a position adjustment mechanism is arranged between the head support bracket (5) and the head support body (4) for controlling the location of the head support body (4) relative to the head support bracket (5).

2. The baby car seat as claimed in claim 1, wherein the backrest wings (16) and the backrest body (15) are one-piece.

3. The baby car seat as claimed in claim 1, wherein the head support wings (14) and the head support body (4) are one-piece.

4. The baby car seat as claimed in claim 1, wherein the position adjustment mechanism comprises:
   a plurality of locking grooves (9) which are formed as recesses on a side of the head support bracket (5), and the plurality of locking grooves (9) being arranged along the longitudinal direction of the head support (3);
   a position-limit groove (10) opened on the head support body (4), the center line of the longitudinal section of the position-limit groove (10) being substantially parallel to the center line of the longitudinal section of each locking groove (9);
   a locking pin (13), which is slidably disposed within the position-limit groove (10) along the position-limit groove (10);
   an operating handle (6) slidably disposed on the head support body (4) along the longitudinal direction of the head support (3), a guiding inclined groove (11) on the operating handle (6), and the guiding inclined groove (11) being inclined relative to the longitudinal direction of the head support (3) and the center line of the longitudinal section of the position-limit groove (10), and the locking pin (13) being inserted into the guiding inclined groove (11);
   wherein during the sliding of the operating handle (6) relative to the head support body (4), the locking pin (13) slides along the position-limit groove (10) under guiding of the guiding inclined groove (11) such that the position adjustment mechanism has a locked position and an unlocked position, when in the locked position, one of the locking grooves (9) is corresponding to the position-limit groove (10) and the locking pin (3) is inserted into the locking groove (9), and when in the unlocked position, the locking pin (3) is detached from the locking groove (9).

5. The baby car seat as claimed in claim 4, wherein the position adjustment mechanism also comprises an elastic member which is used for applying a force on the locking pin (13) such that the locking pin (13) can be steadily inserted into the locking groove (9).

6. The baby car seat as claimed in claim 4, wherein the center line of the longitudinal section of each locking groove (9) and the center line of the longitudinal section of the position-limit groove (10) respectively are perpendicular to the longitudinal direction of the head support (3).

7. The baby car seat as claimed in claim 5, wherein the elastic member (12) is arranged between the operating handle (6) and the head support body (4).

8. The baby car seat as claimed in claim 4, wherein the longitudinal section of locking groove (9) is U-shaped, such that the position-limit groove (10) forms a closed groove together with the locking groove (9) when the position adjustment mechanism is in the locked position.

9. The baby car seat as claimed in claim 4, wherein the guiding inclined groove (11) has an upper side portion and a lower side portion, the upper side portion of the guiding inclined groove (11) is substantially corresponding to the locking groove (9) in the longitudinal direction and the lower side portion of the guiding inclined groove (11) is substantially corresponding to the outside of the opening of the locking groove (9) in such a way that: when the position adjustment mechanism is in the locked position, the locking pin (13) is in the upper side portion of the guiding inclined groove (11), when the position adjustment mechanism is in the unlocked position, the locking pin (13) is in the lower side portion of the guiding inclined groove (11).

10. The baby car seat as claimed in any of claim 4, wherein the head support body (4) comprises a front cover plate (7) and a rear cover plate (8) fixedly connected with the front cover plate (7), an accommodating space with a downward opening being formed between the front cover plate (7) and the rear cover plate (8), the head support bracket (5) and the operating handle (6) being located in the accommodating space, and the operating handle (6) being located between the head support bracket (5) and the rear cover plate (8), and an opening on the rear cover plate (8) for allowing a user to stretch out his/her hand into the accommodating space to move the operating handle (6).

* * * * *